(12) United States Patent
Shibutani et al.

(10) Patent No.: US 9,765,166 B2
(45) Date of Patent: Sep. 19, 2017

(54) CROSSLINKABLE POLYMER (71) Applicants: THE NIPPON SYNTHETIC CHEMICAL INDUSTRY CO., LTD., Osaka (JP); NOVARTIS AG, Basel (CH)

(72) Inventors: Mitsuo Shibutani, Osaka (JP); Masahiro Saito, Osaka (JP); Bernhard Seiferling, Goldbach (DE); Jiro Tsuchiya, Kanagawa (JP); Hirohiko Miura, Kanagawa (JP); Yasuo Matsuzawa, Roswell, GA (US)

(73) Assignees: THE NIPPON SYNTHETIC CHEMICAL INDUSTRY CO., LTD., Osaka (JP); NOVARTIS AG, Basel (CH)

( * ) Notice: Subject to any disclaimer, the term of this patent is extended or adjusted under 35 U.S.C. 154(b) by 0 days.

(21) Appl. No.: 15/029,363

(22) PCT Filed: Oct. 17, 2013

(86) PCT No.: PCT/JP2013/078750
§ 371 (c)(1),
(2) Date: Apr. 14, 2016

(87) PCT Pub. No.: WO2015/056356
PCT Pub. Date: Apr. 23, 2015

(65) Prior Publication Data
US 2016/0264701 A1  Sep. 15, 2016

(51) Int. Cl.
C08F 2/46 (2006.01)
C08G 61/04 (2006.01)
C08F 218/08 (2006.01)
C08F 216/06 (2006.01)
C08F 218/10 (2006.01)
C08F 8/12 (2006.01)
C08F 8/30 (2006.01)
G02B 1/04 (2006.01)
C08F 216/38 (2006.01)

(52) U.S. Cl.
CPC .............. *C08F 218/08* (2013.01); *C08F 8/12* (2013.01); *C08F 8/30* (2013.01); *C08F 216/06* (2013.01); *C08F 216/38* (2013.01); *C08F 218/10* (2013.01); *G02B 1/043* (2013.01)

(58) Field of Classification Search
CPC ...... C08F 2108/08; C08F 216/06; C08F 8/12; C08F 8/30; G02B 1/043; C08L 29/04
USPC .......................................... 522/173, 1; 520/1
See application file for complete search history.

(56) References Cited

U.S. PATENT DOCUMENTS

| | | |
|---|---|---|
| 5,508,317 A | 4/1996 | Muller |
| 5,583,163 A | 12/1996 | Muller |
| 5,789,464 A | 8/1998 | Muller |
| 5,807,927 A | 9/1998 | Stockinger et al. |
| 5,849,810 A | 12/1998 | Muller |
| 6,149,842 A | 11/2000 | Lally et al. |
| 6,156,244 A | 12/2000 | Muller et al. |
| 6,265,509 B1 | 7/2001 | Muller |
| 6,407,145 B1 | 6/2002 | Muller |
| 8,030,369 B2 | 10/2011 | Winterton |
| 9,139,645 B2 | 9/2015 | Min et al. |
| 2003/0025222 A1* | 2/2003 | Bothe ............... C08L 29/14 264/1.1 |
| 2006/0079598 A1* | 4/2006 | Winterton .......... C08L 29/04 523/106 |
| 2009/0253865 A1* | 10/2009 | Shibutani ............. B41M 5/44 525/59 |
| 2010/0261830 A1* | 10/2010 | Shibutani .............. C08J 5/18 524/503 |
| 2012/0041118 A1* | 2/2012 | Shibutani ........... C08F 216/02 524/284 |
| 2012/0157627 A1* | 6/2012 | Shibutani ........... C08L 29/04 525/57 |
| 2013/0131270 A1* | 5/2013 | Shibutani ........... C08L 29/04 525/69 |
| 2013/0249059 A1* | 9/2013 | Sato .................. H01L 21/2225 257/607 |
| 2014/0004350 A1* | 1/2014 | Shibutani ........... C08L 29/04 428/413 |
| 2014/0107275 A1* | 4/2014 | Uemura ............... H01M 4/628 524/503 |
| 2015/0037129 A1* | 2/2015 | Okamoto ............ B65G 1/0435 414/751.1 |
| 2015/0307674 A1* | 10/2015 | Sakai ................. C08L 77/06 525/56 |

FOREIGN PATENT DOCUMENTS

| | | | |
|---|---|---|---|
| EP | 2075286 | * | 7/2009 |
| JP | 2006-104309 A | | 4/2006 |

(Continued)

OTHER PUBLICATIONS

Shibutani et al, EP2075286 Machine Translation, Jul. 1, 2009.*
Muhlebach et al., "New Water-Soluble Photo Crosslinkable Polymers Based on Modified Poly(vinyl alcohol)", Journal of Polymer Science: Part A: Polymer Chmistry, 1997, pp. 35, 3603-3611.
Buhler et al., "Nelfilcon A, a New Material for Contact Lenses", Chimia, 1999, pp. 53, 269-274.

(Continued)

*Primary Examiner* — Jessica E Whiteley
(74) *Attorney, Agent, or Firm* — Greenblum & Bernstein, P.L.C.

(57) ABSTRACT

The present invention provides a crosslinkable prepolymer which can be used to produce crosslinked polymeric materials (or contact lenses containing the same) having a high strength and excellent durability. The present invention relates to a polyvinyl alcohol-based prepolymer containing a unit having a pendant 1,2-diol containing group and a unit having a specific crosslinkable functional group, as well as a molding using the same.

20 Claims, 4 Drawing Sheets

(56) References Cited

FOREIGN PATENT DOCUMENTS

| JP | 2008-515576 A | | 5/2008 |
|----|---------------|---|--------|
| WO | 2012014981 | * | 2/2012 |

OTHER PUBLICATIONS

Winterton et al., "The Elution of Poly (vinyl alcohol) From a Contact Lens: The Realization of a Time Release Moisturizing Agent/Artifical Tear", Journal of Biomedical Materals Research Part B: Applied Biomaterials, pp. 424-432, Published online Jul. 12, 2006.

International Search Report issued with respect to application No. PCT/JP2013/078750, dated Apr. 22, 2014.

International Preliminary Report on Patentability issued with respect to application No. PCT/JP2013/078750, dated Apr. 19, 2016.

* cited by examiner

CROSSLINKABLE POLYMER

TECHNICAL FIELD

The present invention relates to a water-soluble polyvinyl alcohol-based prepolymer containing at one monomeric unit having a pendant 1,2-diol containing group and at least one monomeric unit containing a crosslinkable functional group, the prepolymer being capable of affording a crosslinked polymeric material which has a high strength and is excellent in durability and water retention ability, and also relates to a crosslinked polymeric material thereof, as well as a molding and a contact lens using the same.

BACKGROUND ART

It is greatly desirable for a contact lens to have high hydrophilicity and water retention ability as well as high wearing comfort. As a process for producing such a contact lens, for example, there is known a process for producing a contact lens wherein an aqueous solution containing a polyvinyl alcohol prepolymer having crosslinkable functional groups is produced and is crosslinked in a mold to obtain a molding (see, for example, Patent Literature 1).

However, the contact lens obtained by the above process is insufficient in strength and durability against damage and stress and thus there is a concern that the contact lens may be broken at the time when removed from the mold at production or when inserted and/or worn on the eye.

CITATION LIST

Patent Literature

[PTL 1] JP-T-2008-515576

Non Patent Literature

[NPL 1] A. Muhlebach, B. Muller, C. Pharisa, M. Hofmann, B. Seiferling and D. Guerry "New Water-Soluble Photo Crosslinkable Polymers Based on Modified Poly(vinyl alcohol)" *Journal of Polymer Science: Part A: Polymer Chemistry*, 35, 3603-3611 (1997).

[NPL 2] N. Buhler, H. P. Haerri, M. Hofmann, C. Irrgang, A. Muhlebach, B. Muller and F. Stockinger "Nelfilcon A, a New Material for Contact Lenses" *Chimia*, 53, 269-274 (1999).

SUMMARY OF INVENTION

Technical Problem

An object of the present invention is to provide a crosslinkable prepolymer which can be used to obtain crosslinked polymeric materials (or moldings containing the same) having a high strength, excellent in durability and water retention ability. Moreover, another object of the present invention is to provide a contact lens excellent in durability at production and during handling and wearing.

Solution to Problem

As a result of the extensive studies in consideration of the above circumstances, the present inventors have found that the objects of the present invention are achieved by a specific polyvinyl alcohol-based prepolymer containing at least one unit having a pendant 1,2-diol containing group and at least one unit having a crosslinkable functional group, and thus have accomplished the present invention.

Namely, the present invention includes the following embodiments.

[1] A polyvinyl alcohol-based prepolymer comprising at least one unit of the formula (1) (i.e., unit having a pendant 1,2-diol containing group) and at least one unit of the formula (2) (i.e., crosslinkable unit):

wherein
each of $R^{1a}$, $R^{2a}$ and $R^{3a}$ independently is hydrogen or an organic group,
X is a single bond or a bonding chain, and
each of $R^{4a}$, $R^{5a}$ and $R^6$ independently is hydrogen or an organic group;

wherein
$R^b$ is an alkylene group having up to 12 carbon atoms,
$R^{1b}$ is hydrogen or a $C_1$-$C_6$ alkyl group,
$R^{2b}$ is an olefinically unsaturated, electron-withdrawing, crosslinkable functional group, and
$R^{3b}$ is hydrogen, a $C_1$-$C_6$ alkyl group or a cycloalkyl group.

[2] The polyvinyl alcohol-based prepolymer according to [1], wherein $R^{2b}$ in the formula (2) is an olefinically unsaturated, electron-withdrawing, crosslinkable functional group, having up to 25 carbon atoms.

[3] The polyvinyl alcohol-based prepolymer according to [1] or [2], which further comprises at least one unit of the formula (3):

wherein $R^{1c}$ is a $C_1$-$C_6$ alkyl group.

[4] A crosslinked polymer obtainable by photocrosslinking the polyvinyl alcohol-based prepolymer according to any one of [1] to [3].

[5] A molding comprising the crosslinked polymer according to [4].

[6] Contact lenses comprising the crosslinked polymer obtainable by photocrosslinking the polyvinyl alcohol-based prepolymer according to any one of [1] to [3].

[7] A process for producing moldings by irradiating actinic radiation for a polyvinyl alcohol-based prepolymer according to any one of [1] to [3].

[8] A process for producing contact lenses by irradiating actinic radiation for a polyvinyl alcohol-based prepolymer according to any one of [1] to [3].

Advantageous Effects of Invention

The crosslinked polymer obtained by crosslinking the polyvinyl alcohol-based prepolymer of the present invention comprising the unit of the formula (1) having a pendant 1,2-diol containing group and the unit of the formula (2) having a crosslinkable functional group has a high strength and is excellent in durability and water retention ability. Therefore, for example, at the time when a molding comprising such a crosslinked polymer is used for a contact lens, the lens is difficult to break at production and during handling and wearing and is excellent in durability.

DESCRIPTION OF EMBODIMENTS

The present invention is explained in detail below, but the explanation only shows examples of desirable embodiments.

[Polyvinyl Alcohol-Based Prepolymer]

A polyvinyl alcohol-based polymer (PVA-based polymer) is generally obtained by saponifying a polyvinyl ester-based polymer and is a polymer containing a vinyl alcohol structural unit and a vinyl acetate structural unit that is an unsaponified part. The polyvinyl alcohol-based prepolymer of the present invention contains, in addition to these structural units, unit(s) of the formula (1) having a pendant 1,2-diol containing group and unit(s) of the formula (2) having a crosslinkable functional group and preferably further contains unit(s) of the formula (3) having an acetal group. The following formula shows an example of PVA-based prepolymer of the present invention which comprises units of the formula (1) having a pendant 1,2-diol containing group, units of the formula (2) having a crosslinkable functional group, and units of the formula (3) having an acetal group.

A degree of saponification (measured in accordance with JIS K6726) of the polyvinyl alcohol-based polymer of the present invention is preferably 90 to 100% by mol, particularly preferably 97 to 100% by mol, and further preferably 98 to 99.9% by mol. When the degree of saponification falls within the above range, a crosslinked polymer excellent in hydrophilicity and water retention ability is obtained.

An average degree of polymerization (measured in accordance with JIS K6726) of the polyvinyl alcohol-based prepolymer is 200 to 2200, particularly preferably 250 to 1000, and further preferably 300 to 600. When an upper limit of the average degree of polymerization falls within the above range, the viscosity of an aqueous solution of the polymer and the viscosity of an aqueous solution of the acetalized product do not become exceedingly high and the prepolymer content does not become exceedingly low at the production of a lens, so that it is easy to obtain a lens having a predetermined refractive index. On the other hand, when a lower limit of the average degree of polymerization falls within the above range, the strength of the lens can be retained and thus the lens becomes difficult to break.

The polyvinyl alcohol-based polymer containing the unit of the formula (1) and the unit of the formula (2) is, for example, produced by obtaining a polyvinyl alcohol-based polymer having the unit of the formula (1) and subsequently introducing a crosslinkable functional group thereinto. The polyvinyl alcohol-based prepolymer further containing the unit of the formula (3) is produced by obtaining a polyvinyl alcohol-based polymer containing units of the formula (1), acetalizing the polymer with an aldehyde compound and subsequently introducing the crosslinkable functional group into the resulting acetalized polymer. On this occasion, the acetalization and the introduction of the crosslinkable functional group may be performed in reverse order, and also may be performed at the same time since both reactions are an acetalization reaction.

[Unit of the Formula (1) having a Pendant 1,2-diol Containing Group]

The following will explain the unit of the formula (1).

In the formula (1), each of $R^{1a}$, $R^{2a}$ and $R^{3a}$ independently represents hydrogen or an organic group, X represents a single bond or a bonding chain, and each of $R^{4a}$, $R^{5a}$ and $R^{6a}$ independently represents hydrogen or an organic group. Particularly, the unit wherein all of $R^{1a}$ to $R^{3a}$ and $R^{4a}$ to $R^{6a}$ in the unit of the formula (1) are hydrogen and X is a single bond, i.e., the unit represented by the following formula (1'), is preferred.

Incidentally, examples of the organic groups in $R^{1a}$ to $R^{3a}$ and $R^{4a}$ to $R^{6a}$ in the unit of the formula (1) include alkyl group having 1 to 4 carbon atoms, such as a methyl group, an ethyl group, an n-propyl group, an isopropyl group, an n-butyl group, an isobutyl group, and a tert-butyl group. The organic group may have a functional group such as halogen, a hydroxyl group, an ester group, a carboxylic acid group, or a sulfonic acid group according to need.

Moreover, X in the unit of the formula (1) is most preferably a single bond in view of thermal stability and in view of stability under high temperature and under acidic conditions but may be a bonding chain as long as it does not inhibit the effects of the present invention. Examples of the bonding chain include hydrocarbons such as alkylene, alkenylene, alkynylene, phenylene, and naphthylene (these hydrocarbons may be substituted with halogen or the like such as fluorine, chlorine, or bromine) as well as —O—, —(CH$_2$O)$_m$—, —(OCH$_2$)$_m$—, —(CH$_2$O)$_m$CH$_2$—, —CO—, —COCO—, —CO(CH$_2$)$_m$CO—, —CO(C$_6$H$_4$)CO—, —S—, —CS—, —SO—, —SO$_2$—, —NR$^a$—, —CONR$^a$—, —NR$^a$CO—, —CSNR$^a$—, —NR$^a$CS—, —NR$^a$NR$^a$—, —HPO$_4$—, —Si(OR$^a$)$_2$—, —OSi(OR$^a$)$_2$—, —OSi(OR$^a$)$_2$O—, —Ti(OR$^a$)$_2$—, —OTi(OR$^a$)$_2$—, —OTi(OR$^a$)$_2$O—, —Al (OR$^a$)—, —OAl(OR$^a$)—, —OAl(OR$^a$)O—, and the like (R$^a$ is each independently an arbitrary substituent group, preferably hydrogen or an alkyl group and m is a natural number). Of these, in view of stability at production or at use, an alkylene group having 6 or less carbon atoms, particularly a methylene group, or —CH$_2$OCH$_2$— is preferred.

The content of the unit having a pendant 1,2-diol containing group in the polyvinyl alcohol-based prepolymer of the invention is preferably 2 to 20% by mol, more preferably 4 to 10% by mol, and even more preferably 5 to 8% by mol. When the content of the unit having a pendant 1,2-diol containing group falls within the above range, a crosslinked polymer which has a sufficient water retention ability and is excellent in toughness and flexibility is obtained.

The content of the unit having a pendant 1,2-diol containing group in the polyvinyl alcohol-based polymer can be determined from a $^1$H-NMR spectrum (solvent: DMSO-d6, internal standard: tetramethylsilane) of a completely saponified product of the polyvinyl alcohol-based polymer. Specifically, the content may be calculated from peak areas derived from methylene protons in the vinyl alcohol unit and methine protons of the main chain in the 1,2-diol unit, and peak areas derived from methine protons of the main chain, methine protons and methylene protons at the side chain in the 1,2-diol unit, protons of the hydroxyl groups and protons of the hydroxyl groups in the vinyl alcohol unit, and the like can be secondarily used.

The process for producing the polyvinyl alcohol-based polymer having units of the formula (1) is not particularly limited but the following processes are preferred.

(i) A process of saponification of a copolymer of a vinyl ester-based monomer with a compound represented by the following formula (A).

(ii) A process of saponification and decarboxylation of a copolymer of a vinyl ester-based monomer with a compound represented by the following formula (B).

(iii) A process of saponification and deketalization of a copolymer of a vinyl ester-based monomer with a compound represented by the following formula (C).

In the formulae (A), (B) and (C), all of $R^{1a}$, $R^{2a}$, $R^{3a}$, X, $R^{4a}$, $R^{5a}$ and $R^{6a}$ are the same as in the case of the above formula (1). Moreover, each of $R^{7a}$ and $R^{8a}$ independently is hydrogen or $R^{9a}$—CO— where $R^{9a}$ is an alkyl group having 1 to 4 carbon atoms. Each of $R^{10a}$ and $R^{11a}$ independently is hydrogen or an alkyl group having 1 to 4 carbon atoms.

As the processes (i), (ii) and (iii), processes explained in JP-A-2006-95825 can be used.

Of these, from the viewpoints of excellent copolymerization reactivity and industrial handling ability, it is preferred to use 3,4-diacyloxy-1-butene as the compound represented by the formula (A) in the process (i), and particularly, 3,4-diacetoxy-1-butene is preferably used.

In this connection, when vinyl acetate is used as a vinyl ester-based monomer and it is copolymerized with 3,4-diacetoxy-1-butene, reactivity ratios of individual monomers are as follows: r(vinyl acetate)=0.710, r(3,4-diacetoxy-1-butene)=0.701, which shows that 3,4-diacetoxy-1-butene is excellent in copolymerization reactivity with vinyl acetate as compared with the case of vinylethylene carbonate as one example of the compound represented by the formula (B): r(vinyl acetate)=0.85, r(vinylethylene carbonate)=5.4.

Moreover, a chain transfer constant of 3,4-diacetoxy-1-butene is as follows: Cx(3,4-diacetoxy-1-butene)=0.003 (65° C.), which shows that increase in a degree of polymerization is not inhibited and decrease in a polymerization rate is not caused, as compared with the case of vinylethylene carbonate of Cx(vinylethylene carbonate)=0.005 (65° C.) and the case of 2,2-dimethyl-4-vinyl-1,3-dioxolane of Cx(2,2-dimethyl-4-vinyl-1,3-dioxolane)=0.023 (65° C.) as one example of the compound represented by the formula (C) to he used in the process (iii).

Furthermore, with regard to such 3,4-diacetoxy-1-butene, it is also an industrially large advantage that a by-product generated at the time when a copolymer thereof is saponified is the same as the compound produced as a by-product at saponification from the structural unit derived from vinyl acetate to be frequently used as a vinyl ester-based monomer and hence it is not necessary to provide a special apparatus and step for post-treatment and solvent recovery system thereof and conventional facilities can be utilized.

Incidentally, 3,4-diacetoxy-1-butene can be produced by synthetic methods via an epoxybutene derivative as described in, for example, WO00/24702, U.S. Pat. Nos. 5,623,086, and 6,072,079 and the like, or by a reaction of isomerizing 1,4-diacetoxy-2-butene, which is an intermediate product in a production process for 1,4-butanediol, using a metal catalyst such as palladium chloride.

Moreover, the compound can be commercially available as products from Acros on a reagent level.

As the vinyl ester-based monomer, there may be mentioned vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate, vinyl versatate and the like. Among them, vinyl acetate is preferably used from an economic viewpoint.

Moreover, besides the aforementioned monomers (vinyl ester-based monomer, and compounds represented by the formulae (A), (B) and (C)), as copolymerization component(s), α-olefins such as ethylene and propylene; hydroxyl group-containing α-olefins such as 3-buten-1-ol, 4-penten-1-ol and 5-hexen-1,2-diol and derivatives thereof such as acylated ones; unsaturated acids such as itaconic acid, maleic acid and acrylic acid and salts, monoesters or dialkyl esters thereof; nitriles such as acrylonitrile; amides such as methacrylamide and diacetoneacryl amide; olefin-sulfonic acids such as ethylenesulfonic acid, allylsulfonic acid, methallylsulfonic acid and AMPS or salts thereof; and the like may be copolymerized in the range where the resultant polymer's physical properties are not remarkably affected, specifically within 10% by mol.

A degree of saponification (measured in accordance with JIS K6726) of the polyvinyl alcohol-based polymer having the unit of the formula (1) is preferably 90 to 100% by mol, particularly preferably 97 to 99.9% by mol, and further preferably 98 to 99.8% by mol. Moreover, an average degree of polymerization (measured in accordance with JIS K6726) of the polyvinyl alcohol-based polymer having the unit of the formula (1) is 200 to 2,200, particularly preferably 250 to 1,000, and further preferably 300 to 600.

When the average degree of polymerization is too large, the viscosity at the time when the polyvinyl alcohol-based polymer of the present invention obtained using the above polymer as a raw material is made into an aqueous solution becomes exceedingly high and there is a case where good filling into a mold becomes difficult, the concentration of the aqueous solution should be decreased and hence the strength of the resulting crosslinked polymer decreases or a molding having a predetermined size is not obtained. When the average degree of polymerization is too small, the resulting crosslinked polymer tends to be brittle.

Moreover, the polyvinyl alcohol-based polymer containing the unit of the formula (1) may be one kind or may be a mixture of two or more kinds thereof. In the case where the mixture is used, a degree of polymerization, a degree of saponification, an average content of the units with a pendant 1,2-diol containing group, and weight-average molecular weight of the mixture preferably fall within the aforementioned ranges.

Furthermore, it is also possible to use a PVA-based polymer containing no unit having a pendant 1,2-diol containing group, for example, unmodified PVA as a PVA-based polymer in combination with a PVA-based polymer containing units having a pendant 1,2-diol containing group to make a prepolymer of the invention. However, in that case, it is preferred that the polyvinyl alcohol-based polymer containing the unit of the formula (1) is a main component, specifically is used in an amount of 50% by weight or more, particularly 80% by weight or more based on the total amount of the polyvinyl alcohol-based polymers.

[Unit of the Formula (2) having an Acetal Structure]

The following will explain the unit of the formula (2).

In the formula (2), $R^b$ is an alkylene group having up to 12 carbon atoms, $R^{1b}$ is hydrogen or a $C_1$-$C_6$ alkyl group, $R^{2b}$ is an olefinically unsaturated, electron-withdrawing, crosslinkable functional group, and $R^{3b}$ is hydrogen, a $C_1$-$C_6$ alkyl group or a cycloalkyl group. Particularly, the unit wherein $R^b$ is —$CH_2$—, $R^{1b}$ and $R^{3b}$ are hydrogen, and $R^{2b}$ is methacryloyl ($CH_2$=$C(CH_3)CO$—) or acryloyl ($CH_2$=$CH$—$CO$—), i.e., the unit represented by the following formula (2'), is preferred.

The unit of formula (2') is formed by reacting N-methacryloyl-aminoacetaldehyd-dimethylacetal or N-acryloyl-aminoacetaldehyd-dimethylacetal with 1,3-diol units of a PVA-based polymer in acidic aqueous solution. The content of the unit of formula (2) in the crosslinkable prepolymer of the invention is kinetically controlled. The reaction is terminated by neutralizing the reaction solution with aqueous NaOH solution. The content of the unit of formula (2) in the crosslinkable prepolymer of the invention is from about 0.25% to about 40% by mol, preferably from about 0.5% to about 25% by mol, more preferably from 0.75% to about 12.5% by mol, most preferably from about 1.0% to about 7.5% by mol of units of formula (2).

[The Unit of the Formula (3) having an Acetal Structure]

The polyvinyl alcohol-based prepolymer of the present invention preferably further includes the unit of the formula (3).

$R^{1c}$ in the unit of the formula (3) represents an alkyl group having 1 to 6 carbon atoms. $R^{1c}$ preferably represents an alkyl group having 2 to 5 carbon atoms, and more preferably, $R^{1c}$ represents an alkyl group having 2 to 4 carbon atoms.

When $R^{1c}$ has 6 or less carbon atoms, damage of the rigid structure of the acetal compound and impairment of the hydrophilicity resulting from a small degree of acetalization can be prevented. On the other hand, when $R^{1c}$ has too small number of carbon atoms, association between hydrophobic groups becomes insufficient, so that strength of the lens sometimes decreases.

When the unit of the formula (3) is introduced, the resulting polyvinyl alcohol-based prepolymer associates between the hydrophobic groups in an aqueous solution, so that the molecular size can be kept small even when a degree of polymerization is increased. As a result, it becomes possible to suppress a change of the size to be induced by contraction or the like when the prepolymer is converted into a crosslinked polymer in a mold. Moreover, it is believed that it becomes possible to achieve both of strength and flexibility since the obtained crosslinked polymer has a crosslinked structure through a chemical bond by the crosslinkable functional group and a physical interaction by the association between the hydrophobic groups, i.e., a gentle crosslinked structure in combination.

The amount of the unit of the formula (3) introduced in the polyvinyl alcohol-based prepolymer can be selected from the range of 2 to 80% by mol. Particularly, in the case where the polyvinyl alcohol-based prepolymer of the present invention is used as an aqueous solution, the amount is preferably 2 to 20% by mol, particularly preferably 3 to 12% by mol, and further preferably 5 to 10% by mol. When an upper limit of the unit of the formula (3) falls within the above range, an appropriate viscosity of the aqueous solution can be maintained, so that operability of the solution is satisfactory and a lens having a predetermined size is easily formed. Moreover, an appropriate prepolymer content in the aqueous solution can be maintained and hence a lens having a predetermined refractive index is easily prepared. On the other hand, a lower limit of the amount of the unit of the formula (3) falls within the above range, the association between the hydrophobic groups is sufficient and thus the strength of the lens can be maintained.

The polyvinyl alcohol-based prepolymer containing units of the formula (1), units of the formula (2) and units of the formula (3) can be produced by producing a polyvinyl alcohol-based polymer having the unit of the formula (1), acetalizing the polymer, and further introducing the crosslinkable functional group as mentioned above.

The acetalization of the polyvinyl alcohol-based polymer having the unit of the formula (1) can be performed by any of known processes. Of these, preferred is a process wherein the polyvinyl alcohol-based polymer is acetalized with an aldehyde compound in a solvent in the presence of an acid catalyst. As the process, a precipitation process, a dissolution process, a homogeneous process and the like may be mentioned.

Particularly, in the case where the amount of the unit of the formula (3) is less than 20% by mol, there is preferably used a process wherein the polyvinyl alcohol-based polymer is made into an aqueous solution, an acetalization reaction is carried out at a low temperature in a solvent mainly containing water, and thereafter, an aging reaction (completion of the acetalization reaction and realignment of acetalized parts) is carried out by elevating the system temperature.

Moreover, there is also used a process wherein, using an alcoholic solvent such as isopropyl alcohol or a mixed solvent in which water or the like is used in combination thereof, an acetalization reaction is carried out at a high temperature and then the polyvinyl acetal-based polymer is precipitated by adding water or the like to the system.

The aldehyde compound to he used in the above acetalization reaction is not particularly limited. Examples thereof are; aliphatic aldehydes such as formaldehyde (including trimeric and polymeric paraformaldehyde), acetaldehyde (including trimeric paraacetaldehyde), propionaldehyde, butyraldehyde, isobutyraldehyde, pentylaldehyde, isopentylaldehyde, hexylaldehyde, 2-ethylhexylaldehyde, and cyclohexylaldehyde; aliphatic dialdehydes such as glyoxal, succindialdehyde, and glutardialdehyde; aromatic aldehydes such as benzaldehyde, o-tolaldehyde, p-tolaldehyde, m-tolaldehyde, p-hydroxybenzaldehyde, salicylaldehyde; and heterocyclic aldehydes such as furfural. Of these, acetaldehyde and butyraldehyde are suitably used and particularly, butyraldehyde is suitably used. Moreover, these aldehydes may be used singly or two or more aldehydes may be used as a mixture.

The acid catalyst to be used in the acetalization reaction is not particularly limited but there may be, for example, organic acids such as acetic acid, and para-toluenesulfonic acid, and inorganic acids such as hydrochloric acid, sulfuric acid, and nitric acid, and preferably, hydrochloric acid or sulfuric acid, is used.

Moreover, after completion of the acetalization reaction, it is possible to add an alkaline compound such as sodium hydroxide, potassium hydroxide, ammonia, sodium acetate, sodium carbonate, sodium hydrogen carbonate, or potassium carbonate, an alkylene oxide such as ethylene oxide, or glycidyl ethers such as ethylene glycol diglycidyl ether.

In the polyvinyl acetal-based polymer, there is a case where both of a hydroxyl group in a main chain of the PVA-based polymer and a hydroxyl group in the pendant 1,2-diol groups may be acetalized in some cases. In that case, the degree of acetalization is represented by an amount of the acetalized hydroxyl group based on a total amount of the hydroxyl group before acetalization.

The above acetalization and the above introduction of the crosslinkable functional group can be performed serially and, at that time, either of them may be performed first. Moreover, since both reactions are an acetalization reaction, they can be carried out at the same time and the case is a preferable embodiment since a step can be omitted. The formulae (2) and (3) can also be attached simultaneously to PVA based polymer backbone, formula (1) in acidic condition as described previously.

In addition to the pendant 1,2-diol containing group contained in the unit of the formula (1), the crosslinkable functional group contained in the unit of the formula (2) and the acetal group contained in the unit of the formula (3), the polyvinyl alcohol-based prepolymer of the present invention may contain some other modifying group(s). As the other modifying groups, there may be mentioned those derived from various comonomers described as the copolymerization compounds above and an acetoacetyl group, a cyanoethyl group and the like capable of being introduced by a post-reaction.

The crosslinkable prepolymers of the invention can be crosslinked or polymerized by actinic radiation, including, for example, UV radiation, ionizing radiation such gamma radiation or X-rays, microwave, and the like. They are stable, i.e. spontaneous crosslinking due to homopolymerization does not take place substantially.

The crosslinked polymer of the invention is a hydrogel, and when fully hydrated (i.e. the water content is in equilibrium with a saline solution, typically achieved within 45 minutes for a contact lens-shaped piece of polymer) has a water content of 30-90%, preferably 35-80%, by weight. Preferably, the crosslinked polymer, when fully hydrated, has an averaged contact angle of 75 degrees or less, more preferably 65 degrees or less.

An "average contact angle" refers to a contact angle of water on a surface of a material (measured by Sessile Drop method), which is obtained by averaging measurements of at least 3 individual samples (e.g., contact lenses). Average contact angles (Sessile Drop) of contact lenses can be measured using a VCA 2500 XE contact angle measurement device from AST, Inc., located in Boston, Massachusetts. This equipment is capable of measuring advancing or receding contact angles or sessile (static) contact angles. The measurements are preferably performed on fully hydrated materials.

The crosslinkable prepolymers of the invention may be purified in a manner known per se, for example by precipitation with acetone, dialysis or preferably by ultrafiltration. As a result of this purification procedure, the crosslinkable prepolymers of the invention may be obtained in extremely pure form, e.g. as solvent-free liquids or melts or as concentrated aqueous solutions, which are free from or at least substantially free from reaction products such as salts, and from starting materials or other non-polymeric constituents.

The crosslinkable prepolymers of the invention are advantageously liquid or readily meltable or most preferably water-soluble (i.e., a solubility of at least about 1% by weight).

The preferred purifying process for the crosslinkable prepolymers according to the invention, ultrafiltration, may be carried out in a manner known per se. Thus, it is possible to carry out ultrafiltration repeatedly, for example two to ten times. Alternatively, ultrafiltration may also be carried out continuously, until reaching the desired degree of purity. The desired degree of purity may be basically selected at any desired level.

A crosslinkable prepolymer of the invention can be advantageously used in preparing a contact lens formulation for making contact lenses according to any methods well known to a person skilled in the art, preferably according to the full cast-molding process. In cast-molding, a lens formulation including a crosslinkable prepolymer of the invention typically is dispensed into molds and cured (i.e., polymerized and/or crosslinked) in molds for making contact lenses. Preferably, polymerizing/crosslinking is effected by means of actinic radiation (preferably by means of UV/visible light irradiation in the presence of at least one photoinitiator).

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®. Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers.

A contact lens formulation is preferably solvent-free or essentially solvent-free, more preferably an aqueous solution of a crosslinkable prepolymer of the invention which may be obtained as the result of the preferred purification step, ultrafiltration, optionally after adding an additional vinylic monomers. A contact lens formulation can also comprise other necessary components known to a person skilled in the art, such as, for example, a UV-absorbing agent, a visibility tinting agent (e.g., dyes, pigments, or mixtures thereof), antimicrobial agents (e.g., preferably silver nanoparticles), a bioactive agent, leachable lubricants, leachable tear-stabilizing agents, and mixtures thereof, as known to a person skilled in the art. Resultant contact lenses then can be subjected to extraction with an extraction solvent to remove unpolymerized components from the resultant lenses and to hydration process, as known by a person skilled in the art. Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference. Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In a preferred embodiment, reusable molds are used and the contact lens formulation in the molds is cured actinically under a spatial limitation of actinic radiation to form contact lenses. A "spatial limitation of actinic radiation" refers to an act or process in which energy radiation in the form of rays is directed by, for example, a mask or screen or combinations thereof, to impinge, in a spatially restricted manner, onto an area having a well defined peripheral boundary. A spatial limitation of UV/visible radiation is obtained by using a mask or screen having a radiation (e.g., UV/visible) permeable region, a radiation (e.g., UV/visible) impermeable region surrounding the radiation-permeable region, and a projection contour which is the boundary between the radiation-impermeable and radiation-permeable regions, as schematically illustrated in the drawings of U.S. Pat. No. 6,800,225 (FIGS. 1-11), and U.S. Pat. No. 6,627,124 (FIGS. 1-9), U.S. Pat. No. 7,384,590 (FIGS. 1-6), and U.S. Pat. No.

7,387,759 (FIGS. 1-6), all of which are incorporated by reference in their entireties. The mask or screen allows to spatially projects a beam of radiation (e.g., UV/visible radiation) having a cross-sectional profile defined by the projection contour of the mask or screen. The projected beam of radiation (e.g., UV/visible radiation) limits radiation (e.g., UV/visible radiation) impinging on a lens-forming material located in the path of the projected beam from the first molding surface to the second molding surface of a mold. The resultant contact lens comprises an anterior surface defined by the first molding surface, an opposite posterior surface defined by the second molding surface, and a lens edge defined by the sectional profile of the projected UV/visible beam (i.e., a spatial limitation of radiation). The radiation used for the crosslinking is radiation energy, especially UV/visible radiation, gamma radiation, electron radiation or thermal radiation, the radiation energy preferably being in the form of a substantially parallel beam in order on the one hand to achieve good restriction and on the other hand efficient use of the energy.

Examples of preferred reusable molds are those disclosed in U.S. patent application Ser. No. 08/274,942 filed Jul. 14, 1994, Ser. No. 10/732,566 filed Dec. 10, 2003, Ser. No. 10/721,913 filed Nov. 25, 2003, and U.S. Pat. No. 6,627,124, which are incorporated by reference in their entireties. Reusable molds can be made of quartz, glass, sapphire, $CaF_2$, a cyclic olefin copolymer (such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky.), polymethylmethacrylate (PMMA), polyoxymethylene from DuPont (Delrin), Ultem® (polyetherimide) from G.E. Plastics, PrimoSpire®, etc.

A crosslinkable prepolymer of the invention can also find uses in making optically transparent hydrogel, which can be used for biomedical applications including intraocular lenses, corneal onlays, other ophthalmic devices (e.g., stents, or the like) used on or about the eye or ocular vicinity, catheters, bandages, etc.

EXAMPLES

The following will explain the present invention with reference to Examples but the present invention is not limited to the description of Examples unless it exceeds the gist.

In Examples, "part(s)" and "%" mean weight based ones unless otherwise stated.

Example 1

<Preparation of PVA-based Polymer Containing Side-Chain 1,2-Diol Group>

Into a reaction vessel fitted with a reflux condenser and a stirrer were added 68.0 parts of vinyl acetate, 23.8 parts of methanol and 8.2 parts of 3,4-diacetoxy-1-butene, and azobisisobutyronitrile was added in an amount of 0.3% by mol (based on added vinyl acetate). Under stirring, a temperature was elevated under a nitrogen stream and polymerization was started. At the time when a polymerization ratio of vinyl acetate reached 90%, m-dinitrobenzene was added to terminate the polymerization and an unreacted vinyl acetate monomer was removed outside the system by a method of introducing methanol vapor therein, thereby a methanol solution of a copolymer being obtained.

Then, the methanol solution was further diluted with methanol to adjust the concentration to 45% and was added into a kneader. While the solution temperature was maintained at 35° C., a 2% methanol solution of sodium hydroxide was added in such a ratio that the amount thereof became 11.5 mmol based on 1 mol of the total amount of the vinyl acetate structural unit and the 3,4-diacetoxy-1-butene structural unit in the copolymer, and saponification was performed. As the saponification proceeded, a saponified product was precipitated and, at the time when it became a particle form, it was filtrated, thoroughly washed with methanol, and dried in a hot-air drier to obtain an objective PVA-based polymer (A1).

A degree of saponification of the resulting PVA-based polymer (A1) was found to be 99.6% by mol when analyzed based on an alkali consumption amount required for hydrolysis of remaining vinyl acetate and 3,4-diacetoxy-1-butene. When analyzed in accordance with JIS K6726, an average degree of polymerization was found to be 450. Moreover, a content of the 1,2-diol containing unit represented by the formula (1) was found to be 6% by mol when calculated from an integrated value measured on $^1$H-NMR (300 MHz proton NMR, d6-DMSO solution, internal standard substance: tetramethylsilane, 50° C.).

<Introduction of the Crosslinkable Functional Group>

100 gram of PVA-based polymer (A1) obtained above was added into a reactor vessel with 402.1 g of distilled water. Then, the reactor vessel was placed in water bath at 70° C. and then stirred well to dissolve PVA-based polymer (A1). When it was completely dissolved, cool down the vessel to room temperature.

7.3 g of N-acryloyl-aminoacetaldehyd-dimethylacetal (NAAADA) was added to the reactor vessel while stirring. Then, 6.6 g of distilled water was added to the reactor vessel. 65 g of HCl (37%) was added to the reactor vessel, while stirring and 72.1 g of distilled water was added. Then, the reactor vessel was kept stirring for 23 hours. This reaction between PVA-based polymer and NAAADA was catalyzed by acid and took place in water. This reaction formed hydrolytically stable 6-membered acetal ring.

18% NaOH was added to neutralize the solution mix and a PVA-based prepolymer of the invention is obtained.

Impurities (NaCl, Na-acetate, methanol and residual N-Acryloylamino-acetaldehyde) and excess water were removed by ultrafiltration from the resultant PVA-based prepolymer. The electrical conductivity of waste fluid discharged from the ultra-filtration was checked. The ultra-filtration was completed at when the electrical conductivity reaches at 100 µS or less.

$^1$H-NMR spectrum of the obtained PVA-based prepolymer was determined under the following condition.

Figure 3:
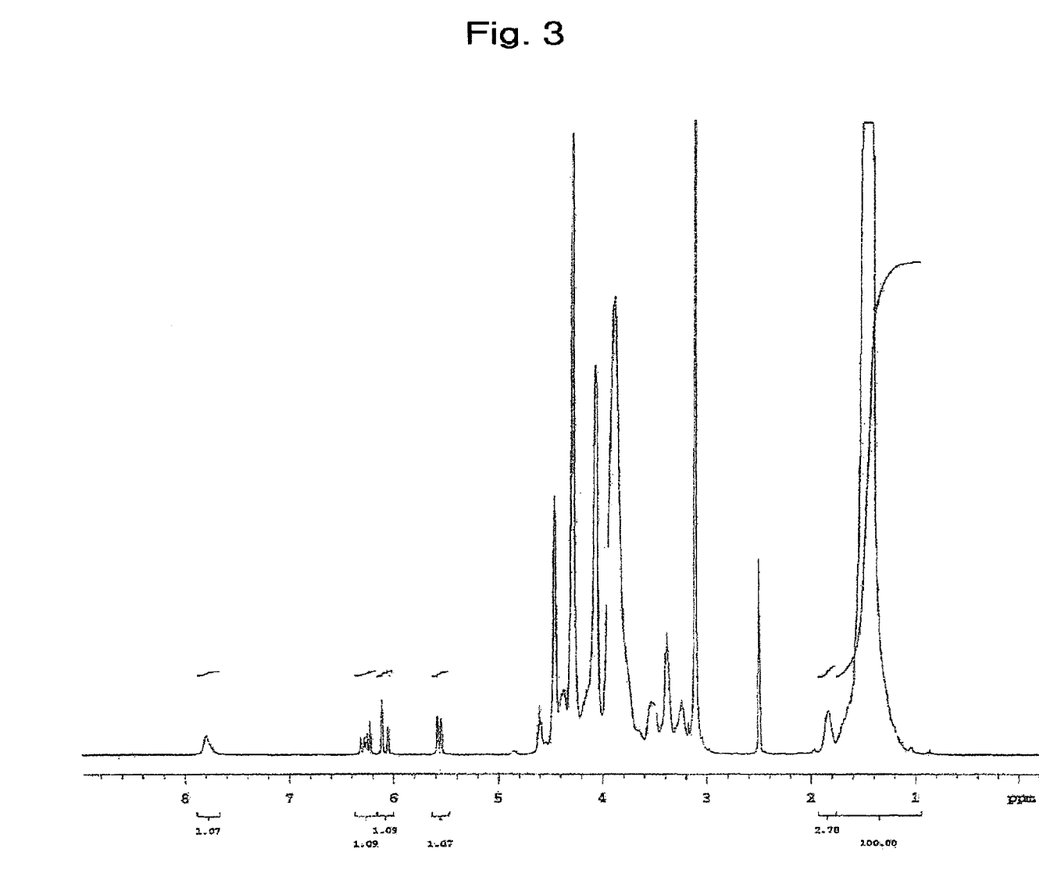
FIG. 3 shows a $^1$H-NMR spectrum chart of PVA-based prepolymer of Example 1.

Solvent: DMSO
Internal Standard Substance: tetramethylsilane
Temperature: 80.0 degrees C./353.1 K
Instrument: UNITY-300 (Varian Inc.)
Pulse Sequence
Relax delay: 10.000 sec
Pulse: 45.0 degrees
Acquisition Time: 1,200 sec
Width: 5999.7 Hz
16 repetitions
Observe H1, 299.9417566 MHz
Data processing
Line broadening: 0.3 Hz
FT size 16384
Total Time 2 min. 59 sec The $^1$H-NMR spectrum chart is shown in FIG. 3 and the assignment of the spectrum is as follows.

1.0 to 1.8 ppm: methylene proton of the main chain
1.8 to 1.9 ppm: methine proton of the main chain which is bound to the modified species of 1,2-glycol
3.2 to 3.3 ppm: methylene proton of the crosslinkable functional group
3.4 ppm: methylene proton of the modified species of 1,2-glycol
3.5 ppm: methine proton of the modified species of 1,2-glycol
3.6 to 4.0 ppm: methine proton of the main chain which is bound to oxygen
4.0 to 4.5 ppm: hydroxyl group proton
4.6 ppm and 4.8 ppm: methine proton of the crosslinkable functional group
5.5 to 6.4 ppm: methine proton and methylene proton of the vinyl group in the crosslinkable functional group
7.8 ppm: amide proton of the crosslinkable functional group
2.5 ppm: DMSO
3.1 ppm: water <Preparation of the Molding>

A typical lens formulation including a PVA-based prepolymer is prepared to have the compositions shown in Table 1.

TABLE 1

|  | Weight | % |
| --- | --- | --- |
| PVA-based prepolymer | 9.04 g | 30.2% |
| Photo-initiator (irgacure) | 0.0084 g | 0.028% |
| Purified water | 20.93 | 69.8% |

Contact lenses were prepared by cast-molding from the lens formulation prepared above in a reusable mold (quartz female mold half and glass male mold half), similar to the mold disclosed in U.S. Pat. No. 6,203,909 B1. A fixed amount (e.g., 45-65 mg) of the lens formulation prepared above is introduced into the cavity of the reusable mold. The lens formulation in the mold is irradiated with UV irradiation (4 to 6 mW/cm$^2$) for about 10 seconds (UV irradiation varies depending on the UV intensity)

The mold is opened and the contact lens removed, washed with deionized water to remove excess unreacted formulation. The lens is placed in a small glass vial along with approximately 2.5 ml of phosphate buffered saline (an osmolarity of from about 250 to about 400 mOsm). The vial is tightly sealed. The lens is then sterilized in an air over steam autoclave at 121° C. for a 30 minutes total cycle time.

The formed hydrogel contact lenses contained a 70% of water and have a diameter of 14 mm.

[Tensile Test]

A test piece having a width of 3 mm was cut out of the molding (contact lens having a diameter of 14 mm) and a tensile test was performed under the following conditions to measure Young's modulus, tensile strength, tensile elongation and strength at break.

Measurement instrument: Zwicki 1 kN Material Testing Machine
Crosshead Rate: 5 mm/min
Distance between chuck: 6.5 mm
Measurement environment: Samples were immersed in saline bath.
Ambient temperature and humidity.
Number of test samples: 20

The water content of the samples (weight(wet)−weight (dry)/weight(dry)) was measured by soft contact lens water content instrument (CL-2L, Atago Co., Ltd.).

Example 2

<Introduction of Acetal Group>

Into a reaction vessel fitted with a reflux condenser and a stirrer were added 240 parts of a 25% aqueous solution of the PVA-based polymer (A1). Under stirring, a temperature was adjusted to 37° C. and 1.53 parts of 35% hydrochloric acid was added thereto. Then, 3.15 parts of n-butyraldehyde was added thereto over a period of 30 minutes. After a reaction was carried out for 6 hours with maintaining at 37° C., 8.5 parts of a 9.94% aqueous NaOH solution was added to neutralize the resulting reaction solution. After natural cooling overnight, the reaction solution was added into acetone in an amount about 3.3 times the amount of the solution under stirring to precipitate a butyral polymer. The precipitated butyral polymer was dissolved in water. The butyral polymer solution was again precipitated in acetone. After the precipitated butyral polymer was air-dried for 3 days, it was vacuum-dried at 40° C. for 3 days and then crushed. A degree of butyralization was found to be 6.5 (mol %) based on an integrated value of methyl protons of the butyral group, an integrated value of methylene protons of the main chain and the butyral group, an integrated value of methyl protons of the acetyl group and an integrated value of methine protons of the main chain to which the 1,2-diol group was bonded upon $^1$H-NMR.

The NAAADA, crosslinker was attached to the PVA-based polymer backbone by cyclic-acetal formation in acidic aqueous solution.

<Introduction of the Crosslinkable Functional Group>

100 gram of PVA-based polymer (A1) obtained above was added into a reactor vessel with 402.1 g of distilled water. Then, the reactor vessel was placed in water bath at 70° C. and then stirred well to dissolve PVA-based polymer (A1). When it was completely dissolved, cool down the vessel to room temperature.

7.3 g of N-acryloyl-aminoacetaldehyd-dimethylacetal (NAAADA) was added to the reactor vessel while stirring. Then, 6.6 g of distilled water was added to the reactor vessel. 65 g of HCl (37%) was added to the reactor vessel, while stirring and 72.1 g of distilled water was added. Then, the reactor vessel was kept stirring for 23 hours. This reaction between PVA-based polymer and NAAADA was catalyzed by acid and took place in water. This reaction formed hydrolytically stable 6-membered acetal ring. This reaction between PVA-based polymer and NAAADA was catalyzed by acid and took place in water. This reaction formed hydrolytically stable 6-membered acetal ring.

18% NaOH was added to neutralize the solution mix and a PVA-based prepolymer of the invention is obtained.

Impurities (NaCl, Na-acetate, methanol and residual N-Acryloylamino-acetaldehyde) and excess water were removed by ultrafiltration from the resultant PVA-based prepolymer. The electrical conductivity of waste fluid discharged from the ultra-filtration was checked. The ultra-filtration was completed at when the electrical conductivity reaches at 100 µS or less.

$^1$H-NMR spectrum of the obtained PVA-based prepolymer was determined under the following condition.
Solvent: DMSO
Internal Standard Substance: tetramethylsilane
Temperature: 80.0 degrees C./353.1 K
Instrument: UNITY-300 (Varian Inc.)

Figure 4:
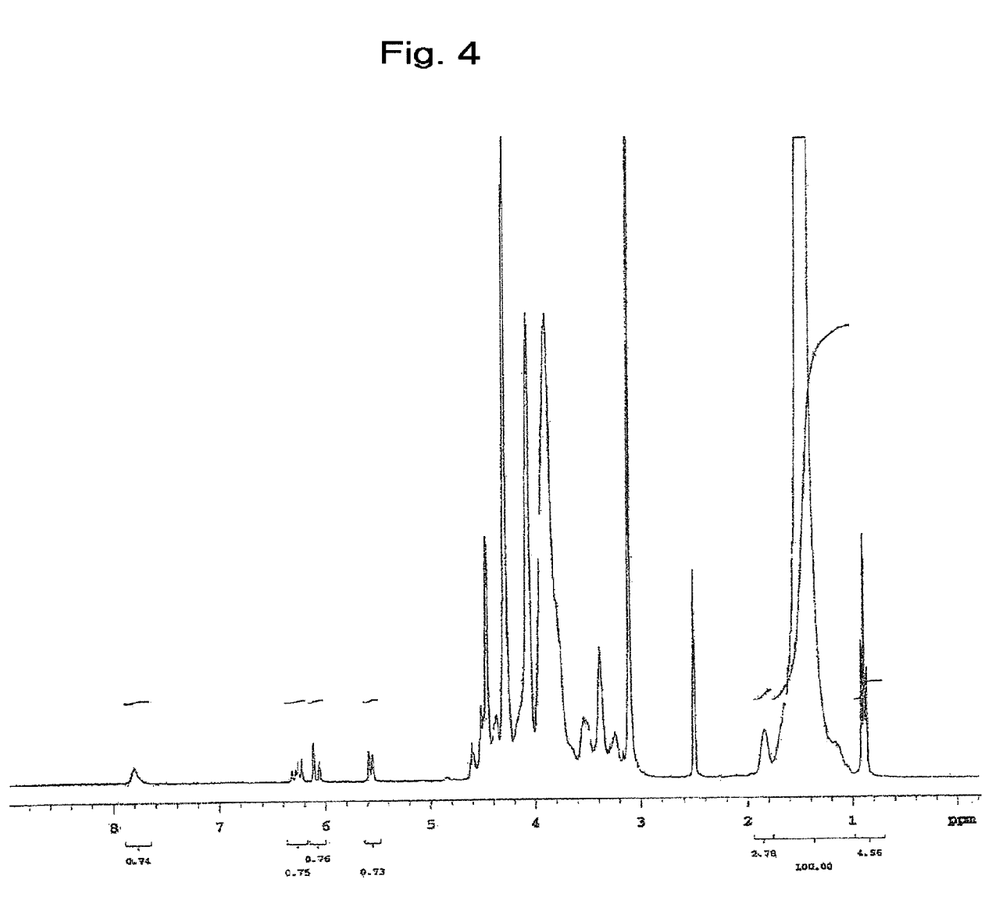
FIG. 4 shows a $^1$H-NMR spectrum chart of PVA-based prepolymer of Example 2.

Pulse Sequence
Relax delay: 10.000 sec
Pulse: 45.0 degrees
Acquisition Time: 1,200 sec
Width: 5999.7 Hz
16 repetitions
Observe H1, 299.9417558 MHz
Data processing
Line broadening: 0.3 Hz
FT size 16384
Total Time 2 min. 59 sec The $^1$H-NMR spectrum chart is shown in FIG. 4 and the assignment of the spectrum is as follows.

0.7 to 0.9 ppm: methyl proton of the butyral group
1.0 to 1.8 ppm: methylene proton of the main chain and methylene proton of the butyral group
1.8 to 1.9 ppm: methine proton of the main chain which is bound to the modified species of 1,2-glycol
3.2 to 3.3 ppm: methylene proton of the crosslinkable functional group
3.4 ppm: methylene proton of the modified species of 1,2-glycol
3.5 ppm: methine proton of the modified species of 1,2-glycol
3.6 to 4.0 ppm: methine proton of the main chain which is bound to oxygen
4.0 to 4.5 ppm: hydroxyl group proton
4.5 ppm, 4.6 ppm, and 4.8 ppm: methine proton of the butyral group and the crosslinkable functional group
5.5 to 6.4 ppm: methine proton and methylene proton of the vinyl group in the crosslinkable functional group
7.8 ppm: amide proton of the crosslinkable functional group
2.5 ppm: DMSO
3.1 ppm: water Comparative Example 1

A crosslinkable functional group was introduced in the same manner as in Example 1 except that an unmodified PVA having a degree of polymerization of 350 and a degree of saponification of 80.6% by mol was used as a PVA-based polymer, and then a molding was prepared and evaluation was performed in the same manner as in Example 1.

<Principle & Experimental of Tear Propagation Test>

Tear propagation (trouser) test basically evaluates the force necessary to propagate a tear in polymeric networks (contact lens). This force (F) depends on the thickness, the degree of crosslinking and the elasticity of the torn film (contact lens). A quantitative expression of the stresses arising from a tear propagation test can be given by the tearing energy, which refers to the energy (E) required per surface area (A) of a crack of the lens strip at thickness (t) and tear distance (2s) (See FIG. 1 for the test set up and calculation). The crack propagation mode is out-of-plane shear.

Tearing resistance (TR) can be calculated from force deformation experiments shown as below:

$$TR = \frac{E}{A} = \frac{F*2S}{2S*t} = \frac{F}{t} = \left[\frac{N}{m}\right] \quad (1)$$

Where F is the force to tear the strip, t is the thickness of the tear area. S is tear distance.

Figure 1:
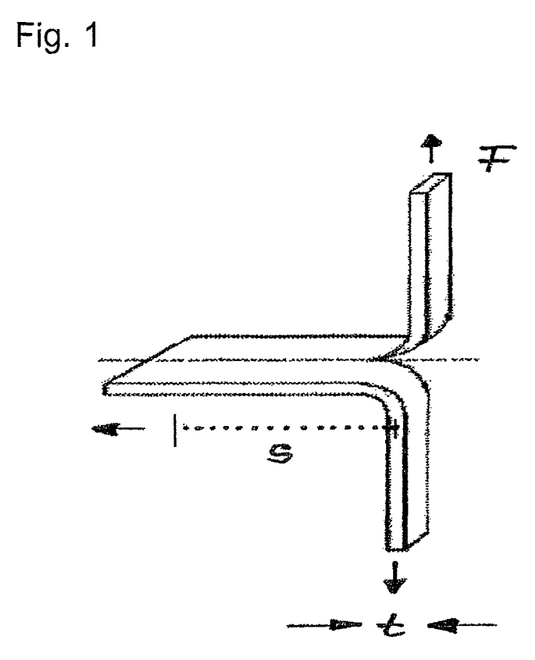
FIG. 1 shows the trouser test set-up and sample geometry.
Figure 2A:
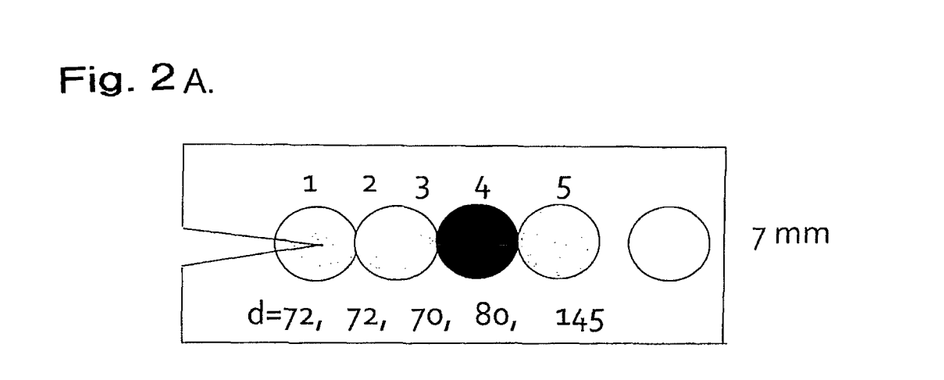
FIG. 2A shows Lens thickness checking points vs. tear diagram in TR calculation.
Figure 2B:
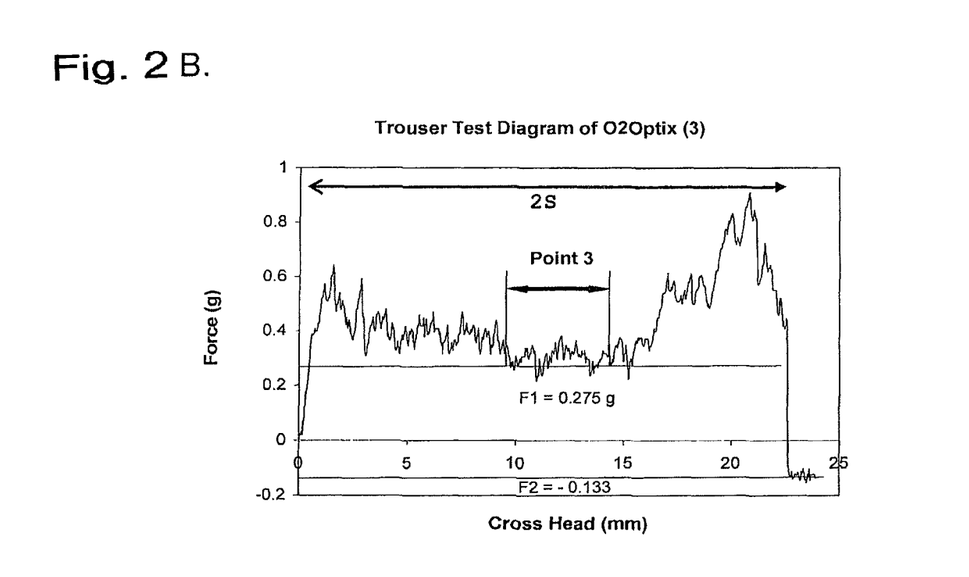
FIG. 2B shows Lens thickness checking points vs. tear diagram in TR calculation (Trouser Test Diagram).

Cutting & Thickness Measurement:

The specimens were cut from lenses in strips of ~14 mm by 7 mm wide; a notch cut of 3.5 mm in the middle of the strip was made by a sharp razor blade. Thus, the experiments performed were of the "trousers" type. The thickness of specimen was measured by checking five places started from the tip of the notch cut to the end of the strip along with the center line. Point #3 was first measured at the thinnest part in center of the strip (this thickness value is very important, it will be used to calculate TR associated with the lowest force in tear diagram), then check the thickness of other points, since the length of strips are different, the point #5 used to be checked closed to the end of strip (thicker than other points) (See FIG. 2).

Measurement:

The tearing test was performed by MTS mechanical tester in air with water mist spraying at room temperature. The two "legs" of test piece (See FIG. 1) were clamped and the upper leg was pulled upward at constant velocity of 0.2 mm/s. The tear resistance (TR) was calculated as:

$$TR\left[\frac{N}{m}\right] = \left[\frac{(F_1 - F_2)[gf]*9.81[N]}{t[m]*[gf]}\right] \quad (2)$$

Where $F_1$ is the lowest applied force during the tear propagation as the strip tore. It happens when tearing the thinnest part of the strip. Usually it is on the center part of the strip. We used to take the average force in that area from the tear diagram (see F1 in FIG. 2). $F_2$ is the "base line" when there is no load between the crosshead after the strip completely torn. The thickness of the thinner part in the area of the third thickness checking point (see red 'dot' in FIG. 2) is associated with average force at the lowest tear force range F1. ΔF, the difference between the F1 and F2 (the force to generate a new surface at center area) and center thickness t are used to calculate the TR (See FIG. 2 for the position of five thickness points associated with the tear force value in the trouser test diagram).

Results of the tensile strength test of Examples and Comparative Example and the tear propagation tests are summarized in Table 2.

TABLE 2

| | E'(Mpa) | EtB(%) | TR(Nm) | NT(Mpa) | NTR |
|---|---|---|---|---|---|
| Example 1 | 0.49 | 100 | 10.4 | 0.33 | 32 |
| Example 2 | 0.72 | 108 | 14.6 | 0.50 | 30 |
| Comparative Example 1 | 0.96 | 114 | 12.7 | 0.67 | 19 |

E': Young's modulus
EtB: Elongation to break
TR: toughness
NT: normalized Toughness
NTR: normalized toughness ratio (TR/NT)

The normalized toughness (NT) is the energy (force) at 100% elongation from the stress-strain test, which is carried out separately. And, the normalized toughness ratio is the ratio of tear resistance and normalized toughness.

While the present invention has been described in detail and with reference to specific embodiments thereof, it will be apparent to one skilled in the art that various changes and modifications can be made therein without departing from the spirit and scope thereof.

INDUSTRIAL APPLICABILITY

Since the polyvinyl alcohol-based prepolymer of the present invention and the molding using the same have a high strength and are excellent in durability, they can be used in a variety of use applications. Particularly, by using the polyvinyl alcohol-based prepolymer of the present invention, there is provided a contact lens excellent in durability at the time when it is removed from a mold at production and at putting in a contact lens.

The invention claimed is:

1. A polyvinyl alcohol-based prepolymer comprising at least one unit of the formula (1) and at least one unit of the formula (2):

(1)

wherein
each of $R^{1a}$, $R^{2a}$ and $R^{3a}$ independently is hydrogen or an organic group,
X is a single bond or a bonding chain, and
each of $R^{4a}$, $R^{5a}$ and $R^{6a}$ independently is hydrogen or an organic group;

(2)

wherein
$R^b$ is an alkylene group having up to 12 carbon atoms,
$R^{1b}$ is hydrogen or a $C_1$-$C_6$ alkyl group,
$R^{2b}$ is an olefinically unsaturated, electron-withdrawing, crosslinkable functional group, and
$R^{3b}$ is hydrogen, a $C_1$-$C_6$ alkyl group or a cycloalkyl group.

2. The polyvinyl alcohol-based prepolymer according to claim 1, wherein $R^{2b}$ in the formula (2) is an olefinically unsaturated, electron-withdrawing, crosslinkable functional group, having up to 25 carbon atoms.

3. The polyvinyl alcohol-based prepolymer according to claim 2, which further comprises at least one unit of the formula (3):

(3)

wherein $R^{1c}$ is a $C_1$-$C_6$ alkyl group.

4. A crosslinked polymer obtainable by photocrosslinking the polyvinyl alcohol-based prepolymer according to claim 1.

5. A molding comprising the crosslinked polymer according to claim 4.

6. The polyvinyl alcohol-based prepolymer according to claim 1, which further comprises at least one unit of the formula (3):

(3)

wherein $R^{1c}$ is a $C_1$-$C_6$ alkyl group.

7. The crosslinked polymer of claim 4, wherein $R^{2b}$ in the formula (2) is an olefinically unsaturated, electron-withdrawing, crosslinkable functional group, having up to 25 carbon atoms.

8. The crosslinked polymer of claim 7, wherein the polyvinyl alcohol-based prepolymer further comprises at least one unit of the formula (3):

(3)

wherein $R^{1c}$ is a $C_1$-$C_6$ alkyl group.

9. The crosslinked polymer of claim 4, wherein the polyvinyl alcohol-based prepolymer further comprises at least one unit of the formula (3):

(3)

wherein $R^{1c}$ is a $C_1$-$C_6$ alkyl group.

10. The molding of claim 5, wherein the moldings are contact lenses.

11. The molding of claim 5, wherein $R^{2b}$ in the formula (2) is an olefinically unsaturated, electron-withdrawing, crosslinkable functional group, having up to 25 carbon atoms.

12. The molding of claim 11, wherein the moldings are contact lenses.

13. The molding of claim 11, wherein the polyvinyl alcohol-based prepolymer further comprises at least one unit of the formula (3):

(3)

wherein $R^{1c}$ is a $C_1$-$C_6$ alkyl group.

14. The molding of claim 13, wherein the moldings are contact lenses.

15. The molding of claim 5, wherein the polyvinyl alcohol-based prepolymer further comprises at least one unit of the formula (3):

(3)

wherein $R^{1c}$ is a $C_1$-$C_6$ alkyl group.

16. The molding of claim 15, wherein the moldings are contact lenses.

17. A process for producing moldings, comprising the step of irradiating actinically a polymerizable composition comprising a polyvinyl alcohol-based prepolymer which comprises at least one unit of the formula (1) and at least one unit of the formula (2):

(1)

wherein
each of $R^{1a}$, $R^{2a}$ and $R^{3a}$ independently is hydrogen or an organic group,
X is a single bond or a bonding chain, and
each of $R^{4a}$, $R^{5a}$ and $R^{6a}$ independently is hydrogen or an organic group;

(2)

wherein
$R^b$ is an alkylene group having up to 12 carbon atoms,
$R^{1b}$ is hydrogen or a $C_1$-$C_6$ alkyl group,
$R^{2b}$ is an olefinically unsaturated, electron-withdrawing, crosslinkable functional group, and
$R^{3b}$ is hydrogen, a $C_1$-$C_6$ alkyl group or a cycloalkyl group.

18. The process of claim 17, wherein $R^{2b}$ in the formula (2) is an olefinically unsaturated, electron-withdrawing, crosslinkable functional group, having up to 25 carbon atoms.

19. The process of claim 18, wherein the polyvinyl alcohol-based prepolymer further comprises at least one unit of the formula (3):

(3)

wherein $R^{1c}$ is a $C_1$-$C_6$ alkyl group.

20. The process of claim 17, wherein the moldings are contact lenses.

* * * * *